(12) United States Patent
Vanstone et al.

(10) Patent No.: US 7,249,254 B2
(45) Date of Patent: Jul. 24, 2007

(54) METHOD AND APPARATUS FOR PROTECTING NTRU AGAINST A TIMING ATTACK

(75) Inventors: Scott A. Vanstone, Campbellville (CA); John A. Proos, Ottawa (CA); Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 644 days.

(21) Appl. No.: 10/734,231

(22) Filed: Dec. 15, 2003

(65) Prior Publication Data

US 2005/0031122 A1  Feb. 10, 2005

Related U.S. Application Data

(60) Provisional application No. 60/459,268, filed on Apr. 2, 2003, provisional application No. 60/433,015, filed on Dec. 13, 2002.

(51) Int. Cl.
*G06F 1/24* (2006.01)
(52) U.S. Cl. .................... 713/155; 713/161; 713/164
(58) Field of Classification Search ................ 713/155, 713/161, 164
See application file for complete search history.

(56) References Cited

U.S. PATENT DOCUMENTS 6,081,597 A   6/2000   Hoffstein et al.

OTHER PUBLICATIONS

Proos, John A., "Imperfect Decryption and an Attack on the NTRU Encryption Scheme,"University of Waterloo, Waterloo, Canada, Jan. 7, 2003.
Consortium for Efficient Embedded Security, EESS #1: Implementation Aspects of NTRUEncrypt and NTRUSign, Version 1, Nov. 2002.
Hess, E; Janssen, N; Meyer, B; Schuetze, T. "Information Leakage Attacks Against Smart Card Implementations of Cryptographic Algorithms and Countermeasures—A Survey", Proceedings of Eurosmart Security Conference, pp. 55-64, Marseilles, 2000, European Smart Card Industry Assoc., 2000.
Shamir, A. "Protecting Smart Cards from Passive Power Analysis with Detached Power Supplies", in Proceedings of Cryptographic Hardware and Embedded Systems—CHES 2000, pp. 71-77, LNCS vol. 1965, C.K. Koc et al, Eds., Springer-Verlag, 2000.
Kocher, P.C. "Timing Attacks on Implementations of Diffie-Hellman, RSA, DSS, and Other Systems", in Advances in Cryptology—CRYPT'96, LNCS vol. 1109, N. Koblitz, Ed., pp. 104-113, Springer-Verlag, 1996.

*Primary Examiner*—Thomas Peeso
(74) *Attorney, Agent, or Firm*—John R.S. Orange; Brett J. Slaney; Blake, Cassels & Graydon LLP

(57) ABSTRACT

A method of decrypting a message encrypted using a truncated ring cryptosystem. The method comprises selecting a window parameter T determining a plurality of windows of a predetermined size, each window being shifted by an amount less than or equal to the window parameter T. A decryption candidate is determined for each possible window. Each decryption candidate is tested to determine whether it is a valid message. The result of the decryption is chosen to be a valid message found in the previous step or if no valid message is found it is indicated that the message could not be decrypted. By this method, a constant number of decryption candidates are determined for each decryption.

30 Claims, 11 Drawing Sheets

METHOD AND APPARATUS FOR PROTECTING NTRU AGAINST A TIMING ATTACK

This application is a non-provisional application claiming priority from U.S. Provisional Application No. 60/433,015 filed Dec. 13, 2002 and U.S. Provisional Application No. 60/459,268 filed Apr. 2, 2003.

BACKGROUND OF THE INVENTION

1. Field of the Invention

The present invention relates to a method and apparatus for performing public key cryptography.

2. Description of the Prior Art

When communicating over public networks, it is often necessary to secure communications in order to prevent interception or fraud by a third party. Cryptographic schemes often use intractable mathematical problems to ensure security of communications. In private key systems, two correspondents share a secret key prior to initiating communications. They can then employ an encryption algorithm using the secret value to keep their communication private from those who do not know the secret value. However, with such systems it is necessary for the two correspondents to agree on the secret beforehand, which may be as difficult as communicating securely in the first place.

Public key cryptosystems address the problem of distributing keys by assigning a pair of keys to each user. Each user has a private key and a corresponding public key, which are mathematically related so that it is computationally infeasible to derive the private key from the public key. The public key may be published and therefore made widely available to all users. To encrypt a message for a particular recipient, the sender uses the recipient's public key. Only the recipient knows the corresponding private key and therefore is the only party able to decrypt the message.

NTRU is a public key encryption system described in U.S. Pat. No, 6,081,597. The NTRU system uses a mathematical structure called a truncated ring of polynomials, which is denoted by R. The NTRU system uses four publicly known system parameters to initially set up the system. These are the degree of polynomials N, two moduli p, q, and the window parameter T. Typically, p is chosen to be 3 or X+2, and q is chosen to be a power of 2. The elements of the ring R may be represented as polynomials of a degree less than N. Operations in the ring are performed by polynomial addition and multiplication with the additional identity that $X^N=1$.

To generate keys in the NTRU system, each user chooses secret polynomials f and g in the ring R. From the polynomial f, the user computes inverses modulo p and q which are denoted as $f_q^{-1}$ and $f_p^{-1}$ respectively. The user can then compute its public key h as $f_q^{-1}$ g. The private key consists of the polynomials f and $f_p^{-1}$.

When a second user wants to send the first user an encrypted message, it uses the first user's public key h. The second user also has access to the system parameters. A message m is encrypted as e=m+prh (mod q). The value r is randomly chosen for each encryption.

Upon receipt of an encrypted message m, the recipient decrypts the message by computing a=ef(mod q). The recipient then establishes a window in the range $$\frac{-q}{2} \text{ to } \frac{q}{2}.$$

The recipient selects coefficients for a in the window. The recipient computes m=a $f_p^{-1}$ (mod p). The recipient then checks that m is in the set of valid messages. If m is in the set of valid messages, then the message has been recovered. Otherwise, the recipient chooses a new window and proceeds to select coefficients in the new window. The four mentioned steps are repeated. This may continue for multiple windows until a valid message is found. Once a valid message is found, execution will stop. If all of the possible windows are exhausted and no valid message has been found, then the recipient will experience an error condition and report that the message cannot be deciphered.

In order to avoid indecipherable messages, it has been suggested that the parameter T be chosen to be at least 30, and as large as 150. Since a large number of windows may be tested, it is likely that a valid message will be found eventually. In most cases however it is not necessary to check all of the windows.

SUMMARY OF THE INVENTION

The inventors have recognised a vulnerability in the NTRU decryption process which may be exploited to determine private keys. The vulnerability exploits indecipherable messages in order to determine multiple bits of the secret key.

The attack proceeds by first finding one message m and one random value r such that the encryption e=m+prh (mod q) is indecipherable. This step is performed by choosing random messages and values r and sending them to the victim for decryption. When decryption fails, it can be noted that the message is indecipherable. In the alternative, the time required to process the message may be measured. Indecipherable messages will require many windows to be tested during decryption, and accordingly will require more time than valid messages. It will be recognised that this attack requires that the victim decrypt messages of the attacker's choosing.

Once the attacker has determined one particular message m and a corresponding value r which yield an indecipherable encryption, the attacker then proceeds to find further indecipherable messages. The attacker proceeds by choosing a new random value $r_1$, and then encrypting m with $r_1$. The attacker then tests if $m+pr_1h$ can be decrypted. If this message cannot be decrypted, then it is saved for further use in the attack. The attacker then repeats the step of choosing a new random value and proceeds to find random values $r_2$, $r_3$, etc. before proceeding with the next phase of the attack.

Once the attacker has contained a large enough number of decipherable messages, the attacker examines the $r_1$ values which have been found. The attacker looks at each co-ordinate, and counts the number of values which occur for each co-ordinate. Because of the structure of the encryption equation, there is likely to be a correlation between the coefficients of these values $r_1$, and the coefficients of the private polynomial g. Once the statistics have been accumulated, the attacker predicts a value of g from the distribution of the coefficients of the $r_1$ values. This value of the polynomial g may then be used to determine the value of $f_q^{-1}$ from the equation for the public key h. The attacker may thus determine all of the private values of the cryptosystem and therefore break the system The inventors have recognised that avoiding the above attack may be performed by having the decryptor perform a constant amount of work for each decryption. This is accomplished by always testing all possible windows even when a valid message has already been found. The attacker therefore cannot determine which messages are actually indecipherable and the attack will be avoided. Preferably, the value of T is chosen to be less than 30 and more preferably less than 10 in order that the additional work from testing all windows is minimised. Ideally, the value of T will be chosen to be 1, 2, or 3.

According to one aspect there is provided a method of decrypting a message encrypted using a truncated ring cryptosystem. The method comprises selecting a window parameter T determining a plurality of windows of a predetermined size, each window being shifted by an amount less than or equal to the window parameter T. A decryption candidate is determined for each possible window. Each decryption candidate is tested to determine whether it is a valid message. The result of the decryption is chosen to be a valid message found in the previous step or if no valid message is found it is indicated that the message could not be decrypted. By this method, a constant number of decryption candidates are determined for each decryption.

According to another aspect, there is provided a method of decrypting a message encrypted using a truncated ring cryptosystem. The method comprises generating a random sequence of integers less than a fixed value, each integer corresponding to a window of a predetermined size and being shifted by the amount of the integer. Decryption candidates are successively determined for each possible window, and tested until a valid message is found, and the valid message is chosen as the result of the decryption. If no valid message is found after each possible window is used, it is indicated that the message could not be decrypted.

According to a further aspect, there is provided a method of selecting system parameters for a truncated ring cryptosystem. The method comprises selecting an initial set of parameters, generating private keys, testing the vulnerability of each private key to an attack on the cryptosystem based on determining indecipherable messages and when the cryptosystem is vulnerable, repeatedly increasing the value of one of the parameters and re-testing the vulnerability until the vulnerability has been reduced.

According to yet another aspect, there is provided a method of encryption with a truncated ring cryptosystem. The method comprises using first, second and third cryptographic hash functions to obtain a first string from a message and a number. The number is used as a second string. The first cryptographic hash function is used to obtain a third string from the message and the number. A padded message is formed from the first, second, and third strings. The padded message is encrypted with an encryption function.

According to a yet further aspect, there is provided a truncated ring cryptographic system comprising system parameters selected by testing the vulnerability of randomly chosen private keys to an attack based on determining indecipherable messages, an encryption engine, and a decryption engine.

According to still another aspect, there is provided a truncated ring cryptographic system comprising system parameters including a window parameter less than 30, an encryption engine, and a decryption engine.

According to a still further aspect, there is provided a decryptor for a truncated ring cryptographic system comprising a window parameter T determining a plurality of windows of a predetermined size, each window being shifted by an amount less than the window parameter T. The decryptor includes a calculator to determine a decryption candidate for each possible window and a tester to determine whether each decryption candidate is a valid message. A selector chooses the result of the decryption to be a valid message or if no valid message is found indicates that the message could not be decrypted.

According to yet another aspect, there is provided a decryptor for a truncated ring cryptographic system comprising a random sequence of integers less than a fixed value, each integer corresponding to a window of a predetermined size and being shifted by the amount of the corresponding integer. The decryptor includes a calculator to determine a decryption candidate for each possible window and a tester to determine whether each decryption candidate is a valid message. A selector chooses the first valid message found by the tester as the result of the decryption.

According to still another aspect, there is provided a system parameter selector for a truncated ring cryptographic system comprising an initial set of parameters, a private key generator, an attack engine to determine the vulnerability of each private key to an attack on the cryptosystem based on determining indecipherable messages, and a parameter updater to repeatedly increase the value of one of the parameters and run the attack engine until the vulnerability of the system to the attack has been reduced.

According to a still further aspect, there is provided an encryptor to encrypt a message in a truncated ring cryptographic system comprising a first, a second, and a third cryptographic hashbrown function, and a generator to generate a number. A message paddler is configured to form a padded message from a first string computed using the first, second and third cryptographic hash functions on the message and the number, a second string formed from the number and a third string computed using the first cryptographic hash function on the message and the number. An encryptor is provided to encrypt the padded message using an encryption function.

According to one aspect there is provided a data carrier containing instructions to direct a processor to decrypt a message encrypted using a truncated ring cryptosystem. The data carrier includes instructions top select a window parameter T determining a plurality of windows of a predetermined size, each window being shifted by an amount less than or equal to the window parameter T. A decryption candidate is determined for each possible window. Each decryption candidate is tested to determine whether it is a valid message. The result of the decryption is chosen to be a valid message found in the previous step or if no valid message is found it is indicated that the message could not be decrypted. A constant number of decryption candidates are determined for each decryption.

According to another aspect, there is provided a data carrier containing instructions to direct a processor to decrypt a message encrypted using a truncated ring cryptosystem. The data carrier includes instructions to generate a random sequence of integers less than a fixed value, each integer corresponding to a window of a predetermined size and being shifted by the amount of the integer. Decryption candidates are successively determined for each possible window, and tested until a valid message is found, and the valid message is chosen as the result of the decryption. If no valid message is found after each possible window is used, it is indicated that the message could not be decrypted.

According to a further aspect, there is provided a data carrier containing instructions to direct a processor to select system parameters for a truncated ring cryptosystem. The data carrier includes instructions to select an initial set of parameters, generate private keys, test the vulnerability of each private key to an attack on the cryptosystem based on determining indecipherable messages and when the cryptosystem is vulnerable, repeatedly increase the value of one of the parameters and re-testing the vulnerability until the vulnerability has been reduced.

According to yet another aspect, there is provided a data carrier containing instructions to direct a processor to encrypt a message using a truncated ring cryptosystem. The data carrier includes instructions to use first, second and third cryptographic hash functions to obtain a first string from a message and a number. The number is used as a second string. The first cryptographic hash function is sued to obtain a third string from the message and the number. A padded message is formed from the first, second, and third strings. The padded message is encrypted with an encryption function.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
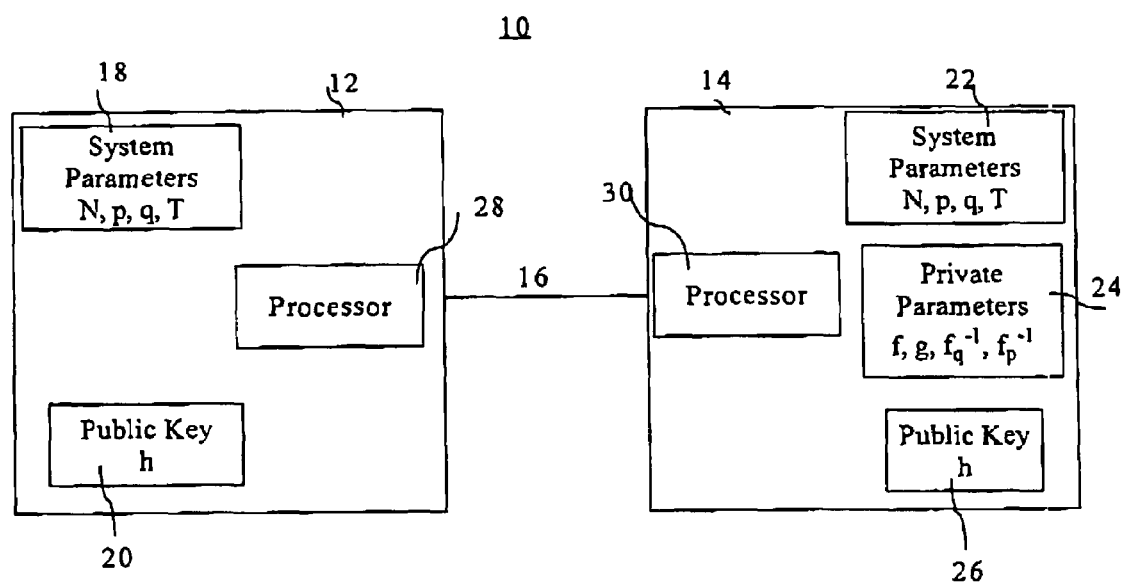
FIG. 1 is a schematic representation of a communication system.

Referring to FIG. 1, a communication system 10 includes correspondents 12, 14 connected by a communication channel 16. The correspondent 12 wishes to send messages to the correspondent 14, and for this purpose has access to certain public parameters of the correspondent 14. The correspondent 14 has system parameters 22, private parameters 24 and a public key 26. The system parameters include a degree N, two moduli p, q and a window parameter T. The private parameters include randomly chosen polynomials f, g and inverses of f modulo q and modulo p. The public key is a value h computed from $f_q^{-1}$ g.

The correspondents 12, 14 also include cryptographic processors 28, 30 for performing cryptographic calculations. The correspondent 12 has a copy of a system parameters 18 and the public 20 of correspondent 14. The correspondent 12 can therefore use these parameters in order to send encrypted messages to the correspondent 14.

The NTRU cryptosystem as presented in U.S. Pat. No. 6,081,597 depends on four parameters (N, p, q, T) and four sets of integer polynomials of degree less than N. The sets include a message space $L_m$, two key spaces $L_f$, $L_g$, and a nonce space $L_r$. All of the integer polynomials belong to the ring $R=Z[x]/(X^N-1)$ and * denotes multiplication in R. The elements of the ring R may be represented as polynomials of a degree less than N. Operations in the ring are performed by polynomial addition and multiplication with the additional identity that $X^N=1$. The parameter q is selected to be a positive integer. The parameter p can then either be a positive integer considerably smaller than q or a small polynomial (in the sense the p(1) is small, in both cases p is required to be relatively prime to q in R.

Polynomials in R will occasionally be reduced modulo q or p. When q and p are integers, this means reducing each coefficient modulo q or p respectively. If p is a polynomial then reducing x modulo p means finding a specific predetermined representative from the set x+Rp={x+yp, y∈R}. Let:

$$L(d_1, d_2) = \left\{ z \in R : \begin{array}{l} z \text{ has } d_1 \text{ coefficients equal to } 1, \\ d_2 \text{ coefficients equal to } -1 \text{ and} \\ \text{the remaining coefficients equal to } 0 \end{array} \right\}.$$

If p is an integer then the window parameter T is usually selected to be zero and $L_f$, $L_g$, $L_r$, and $L_m$ are defined as follows. Define the message space $L_m$ as $$L_m = \left\{ m \in R : m \text{ has all coefficients in } \left[ \left\lfloor \frac{p-1}{2} \right\rfloor, \left\lceil \frac{p-1}{2} \right\rceil \right] \right\}$$

and define the key spaces $L_f$, $L_g$, and the nonce space $L_r$ as $L_f = L(d_f, d_f-1)$ $L_g = L(d_g, d_g)$, and $L_r = L(d_r, d_r)$, where $d_f$, $d_g$, and $d_r$ are positive integers, whose values depend on N, q, and p.

If p is a polynomial then define $L_m$ to be the unique representatives of the sets x+Rp used in reducing modulo p. Note that to aid in decryption the representatives from x+Rp are selected so that the coefficients of polynomials in $L_m$ are small. The sets $L_f$, $L_g$, $L_r$, and the integer T are then selected to allow the decryption algorithm to have a good probability of success. Generally this requires the coefficients of polynomials in $L_f$, $L_g$, and $L_r$ to be small.

Key-pairs are generated by selecting two polynomials f∈$L_f$ and g∈$L_g$ such that there exist polynomials $f_p^{-1}$ and $f_q^{-1}$ satisfying $f*f_p^{-1}=1$ (mod p) and $f*f_q^{-1}=1$ (mod q)

The private key comprises the polynomials f and $f_p^{-1}$. The public key is the polynomial $h=f_q^{-1}$ g (mod q).

Figure 2:
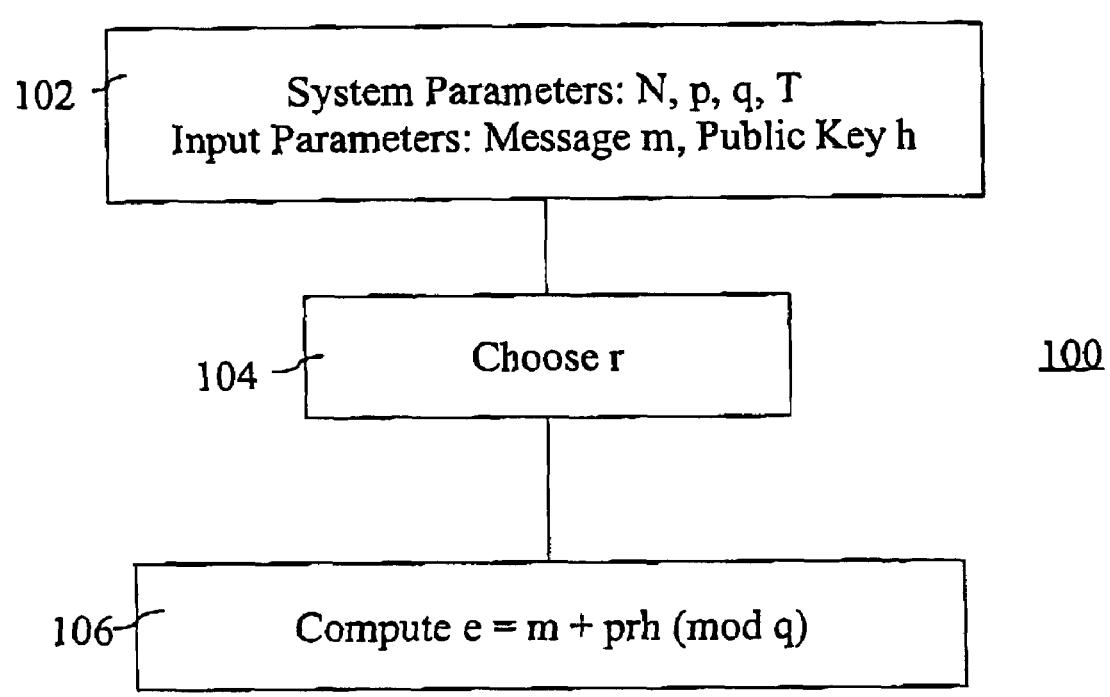
FIG. 2 is a schematic representation of a method of encryption.

Referring to FIG. 2, a method of encrypting a message is shown by the numeral 100. At step 102, the correspondent 12 uses the system parameters N, p, q and T. The input parameters are a message m which the correspondent 12 wishes to send to the correspondent 14 and the public key h of the correspondent 14. The correspondent 12 then chooses the random value r at step 104. The sender then computes e=m+prh (mod q) at step 106.

Figure 3:
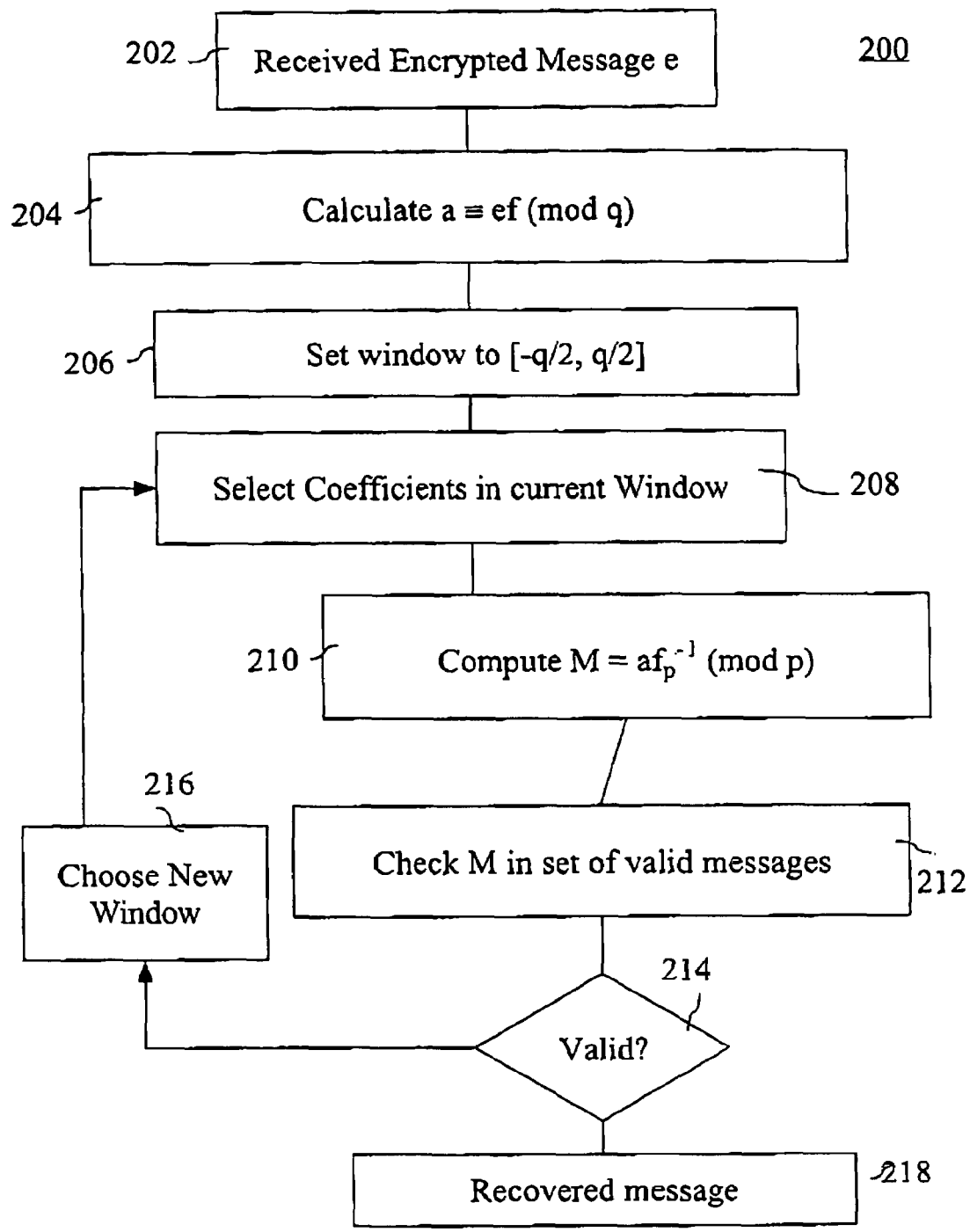
FIG. 3 is a schematic representation of a method of decryption.

Upon receipt of an encrypted message e the correspondent 14 performs the steps shown in FIG. 3 by the numeral 200. The correspondent 14 first receives the encrypted message e at step 202. It then calculates at step 204 a≡ef(mod q). It then sets a window at step 206. The window is initially set to the range $$\frac{-q}{2} \text{ to } \frac{q}{2}.$$

Then, at step 208 the correspondent 14 selects coefficients of a in the current window. At step 210, the correspondent 14 computes $M=af_p^{-1}$ (mod p). Then, at step 212 the correspondent 14 checks that M is in the set $L_m$ of valid messages. If the message M is valid at step 214 then the correspondent 14 uses the message as the recovered message at step 218. If however the message is not valid at step 214, then the correspondent 14 chooses a new window at step 216 and returns to step 208 to select new coefficients.

Given a public key h and a message $m \in L_m$, encryption E proceeds as follows. Select a random element $r \in L_r$ and calculate e=m+prh (mod q). Encryption may be denoted by $E_h(m; r)=e$.

Given a ciphertext e=m+prh (mod q), decryption $D_{f,f_p^{-1}}$ proceeds as follows. First calculate:

$$a \equiv ef(\text{mod} q)$$
$$\equiv mf + prhf(\text{mod} q)$$
$$\equiv mf + prg(\text{mod} q)$$

Now convert the modular reduction above to an integer polynomial by choosing integer representatives for the coefficients of a.

The NTRU parameters were selected in such a way that, for the vast majority of m and r, all the coefficients of mf+prg fall in a range of width q centered at a value that can be determined from e. (Typically the center is the expected value of the coefficients of mf+prg). Thus for most m and r, a equals mf+prg.

In this case, decryption continues as follows:

$$af_p^{-1}(\text{mod} p) \equiv (mf + prg)f_p^{-1}(\text{mod} p)$$
$$\equiv (mf)f_p^{-1}(\text{mod} p)$$
$$\equiv m(\text{mod} p)$$

By definition of the message space, if $m \in L_m$ then m≡m (mod p) and thus a recovers the message m.

If the above does not recover a valid message m, the range of width q is shifted by 1 and the above reduction modulo q is repeated. If this does not recover a valid message, the range is shifted by −1 and the above modular reduction repeated. In the absence of a valid message being recovered, the shifting and reduction by 2, −2, and so on up to a shift by −T at which point decryption is said to fail with a gap failure. The ciphertext in question is said to be an "indecipherable valid ciphertext."

Thus if $E_h^N$ (m; r)=e then $D_{f,f_p^{-1}}$ (e) equals m precisely when a=ef(mod q) reduced to the expected range (shifted up to ±T, if need be) equals mf+prg. This can be used to find a good characterisation for which valid ciphertext will not decipher correctly.

Figure 4:
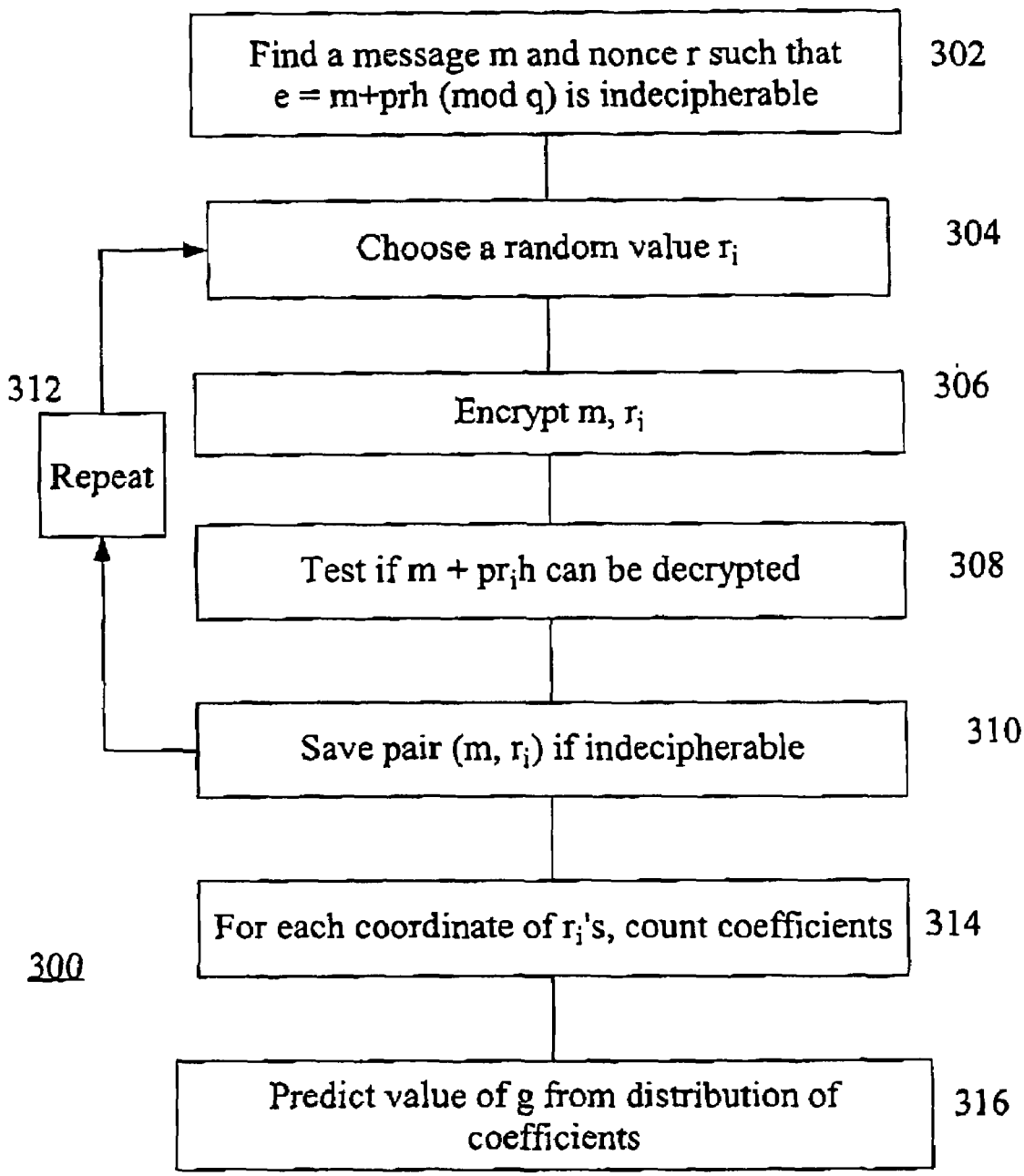
FIG. 4 is a schematic representation of a method of an attack on the system of FIG. 1.

Referring to FIG. 4, the method of attacking the NTRU system is shown generally by the numeral 300. The attacker first finds one message m and a nonce r such that e=m+prh (mod q) is indecipherable. The attacker then chooses the random value $r_i$ at step 304. The attacker then encrypts the message m using the random value $r_i$ at step 306. The attacker then tests if $m+pr_ih$ can be decrypted at step 308. This is performed by sending the message to the victim. It may be necessary to monitor the amount of time that the victim requires to attempt to decrypt. At step 310, the attacker saves the pair m, $r_i$ if the result of encrypted message is indecipherable. The attacker then repeats 312, the choice of random values at step 304 and step 306, 308 and 310 until it has accumulated sufficient values $r_i$. The attacker then examines the co-ordinates of the $r_i$ values which have been found at step 314. The attacker then predicts the value of the private polynomial g from the distribution of the coefficients in the $r_i$ values at step 316.

The attack proceeds in two stages. Stage 1: Randomly search through pairs $(m,r) \in L_m \times L_r$ until the ciphertext generated from the pair (m,r) is an indecipherable valid ciphertext. In practice, this is carried out by encrypting a message to another party, transmitting the ciphertext, and observing whether the ciphertext is rejected as indecipherable. Because a successful decryption with few shifts happens with high probability, it suffices to note the time interval before rejection and assume that any ciphertext not rejected almost at once is indecipherable.

Stage 2: Given the pair (m,r) found in Stage 1, let y=mf. Typically y will have one co-efficient j which is closer to the boundary of decipherability than any other co-efficient. In this case, for random $\bar{r}$, there will be a bias in the co-ordinates of mf+p$\bar{r}$g that may cause the (m,r)-ciphertext to be indecipherable.

The attack proceeds by randomly selecting many $\bar{r}$ and recording the value $\bar{r}$ for which e=m+p$\bar{r}$g (mod q) was indecipherable. Because of the bias in the "bad" co-ordinates of mf+p$\bar{r}$g, the values in the recorded $\bar{r}$ will have a correlation with the secret value g. This allows g to be recovered by analysing the distributions of the values in the recorded $\bar{r}$. The private key can then be recovered. (First, recover the value of f from g and h; second, determine $f_p^{-1}$ from f.)

To limit the number of indecipherable (m, $\bar{r}$) pairs required to determine g from the $\bar{r}$, the attack can be combined with lattice techniques.

If y=mf does have a large co-efficient then the rate at which the (m, $\bar{r}$) are indecipherable will be noticeably larger than the random m and r. Thus by analysing the rate at which $\bar{r}$ are found, we can determine whether y has no large co-efficients, at which point we can simply return to Stage 1. If y=mf has two or more large coefficients which are equally close to the decipherable boundary then the distributions of values in the $\bar{r}$ may not reveal g and the attack will need to return to Stage 1. Note that in this latter case, some information about g may still be determined. In practice, for randomly determined indecipherable (m,r,) there is a good chance that y=mf has the desired properties. Thus we expect that the need to loop to Stage 1 will be infrequent.

Figure 5:
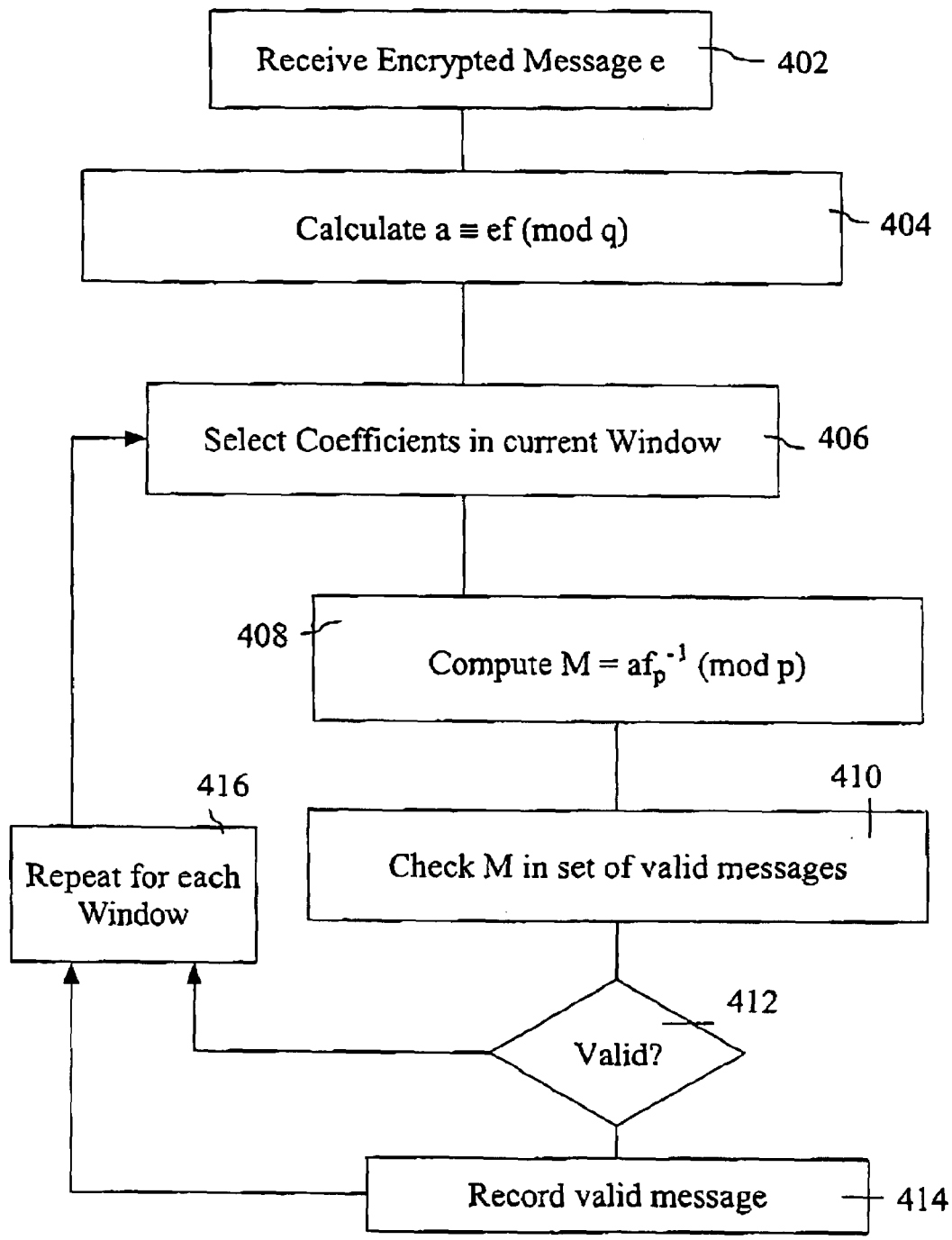
FIG. 5 is a schematic representation of an alternate method of decryption.

Referring to FIG. 5, an embodiment of the invention in which alternate decryption is used is shown generally by the numeral 400. The recipient first receives an encrypted message e at step 402. It then calculates a≡ef (mod q) at step 404. The recipient then selects co-efficients in the current window at step 406. At step 408 the recipient computes $M=af_p^{-1}$ (mod p). The recipient then checks if M is in the set of valid messages at step 410. If the message is valid at step 412, then the recipient records the valid message at step 414. It then proceeds to repeat the steps for each window at step 416. If the message is not valid then the recipient also repeats the steps for each window at step 416. In this way, the recipient performs the same number of operations regardless of how soon it finds a valid message.

To protect against timing attacks, such as the above, it will be recognised that the decryption algorithm has been modified so that a constant amount of work is always done per ciphertext. This is accomplished by proceeding with the decryption steps for each of the 2T+1 possible reduction ranges for a regardless of whether or not the message has been recovered.

Figure 6:
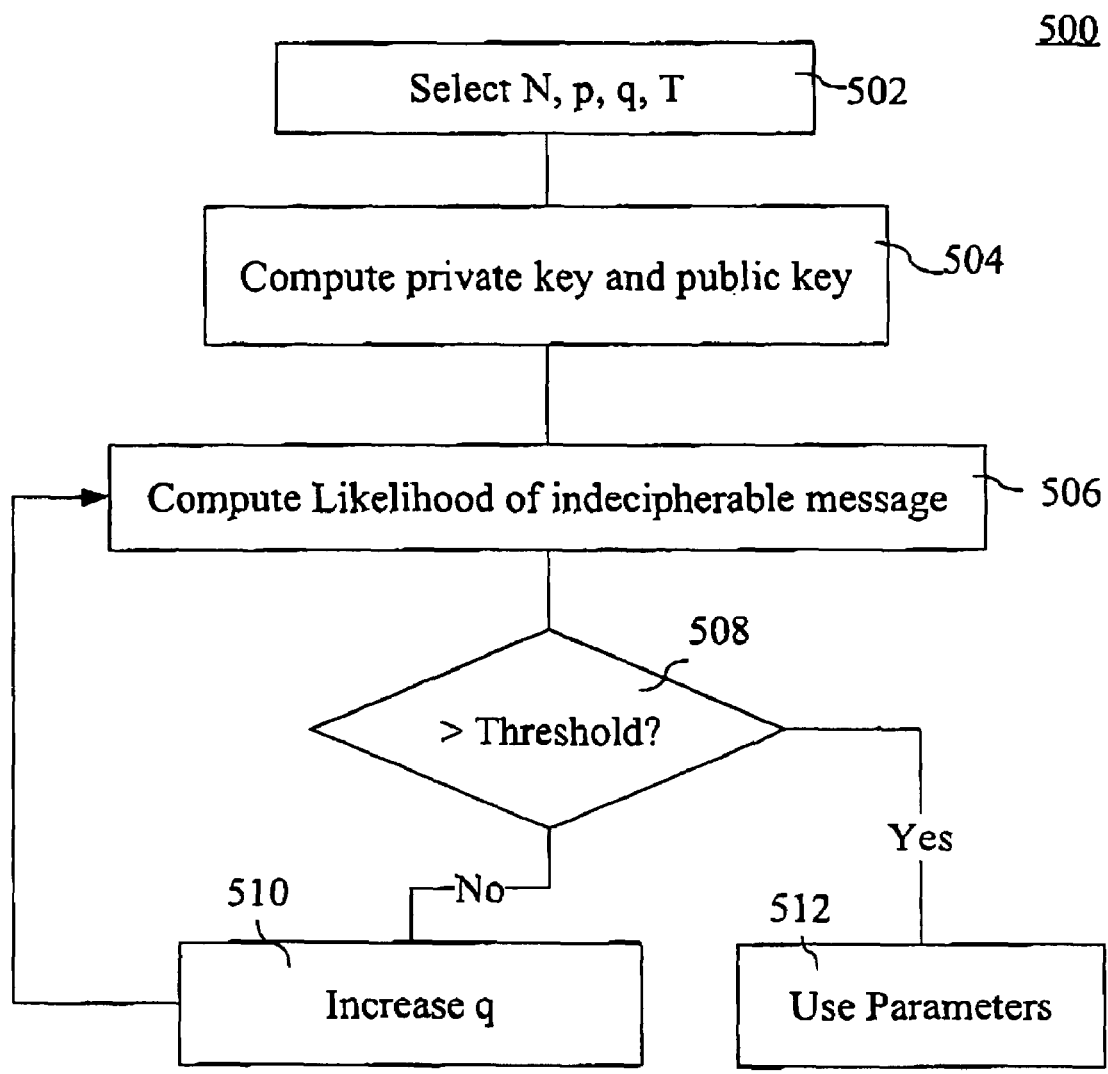
FIG. 6 is a schematic representation of a method of parameter selection.

In an alternative embodiment, randomness is introduced into the sequence of windows. The possible windows 1, −1, 2, −2, . . . , −T, −T are randomly rearranged. This selection of windows will reduce the information revealed by an indecipherable ciphertext since the attacker will not know which windows have been tried and in which order In another embodiment of the invention, shown in FIG. 6 by the numeral 500, the system parameters are chosen in order to reduce the likelihood of finding an indecipherable message. The likelihood of finding indecipherable messages is related to the system parameters N, p, q, and T. Values for these parameters are initially chosen 502 to set up the cryptosystem. Once a private key and public key are generated, 504, the likelihood of finding indecipherable messages is calculated 506. If this value is more than a predetermined value 508, then one of the system parameters is modified 510. If not, then the parameters are used 512. The process may be repeated until desirable parameters are found. Preferably, q is increased in order to expand the window for coefficients modulo q.

In an alternative embodiment, the decryptor monitors received encrypted messages, When a large number of indecipherable messages are detected, the decryptor selects new system parameters. Preferably, the new parameters provide a lower likelihood of obtaining indecipherable messages.

Figure 7:
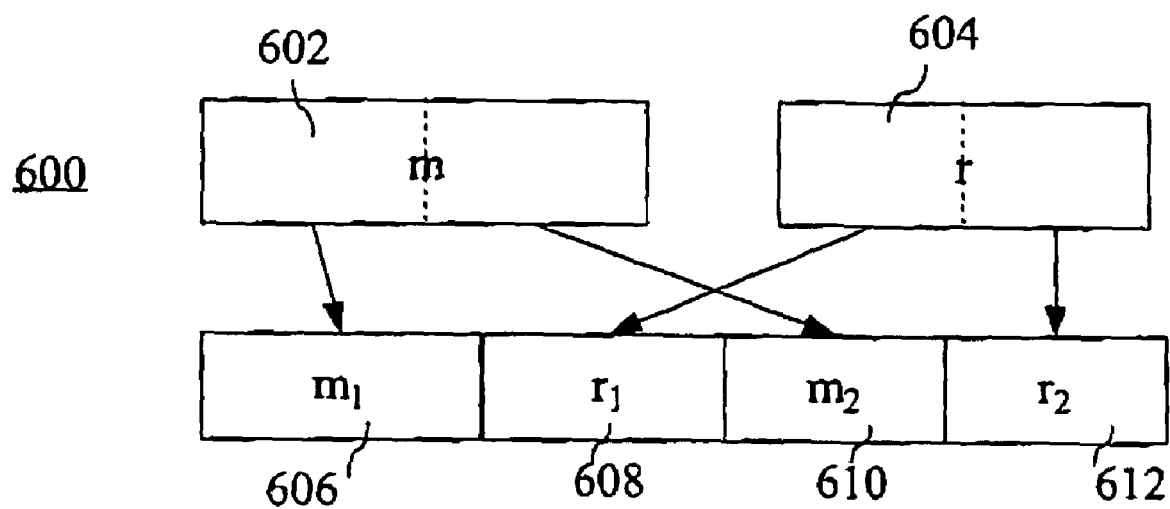
FIG. 7 is a schematic representation of a method of padding.

In another embodiment, messages m (602) are padded with the nonce (604) as shown in FIG. 7 in order to provide randomness throughout the message, This may be done by splitting the message into two parts $m_1$, $m_2$ and the nonce into two parts $r_1$, and $r_2$. Then the encrypted operation is performed on the concatenation $m_1\|r_1\|m_2\|r_2$ (606, 608, 610, 617). Additional parts may be used to further mix bits of m with bits of r.

Figure 8:
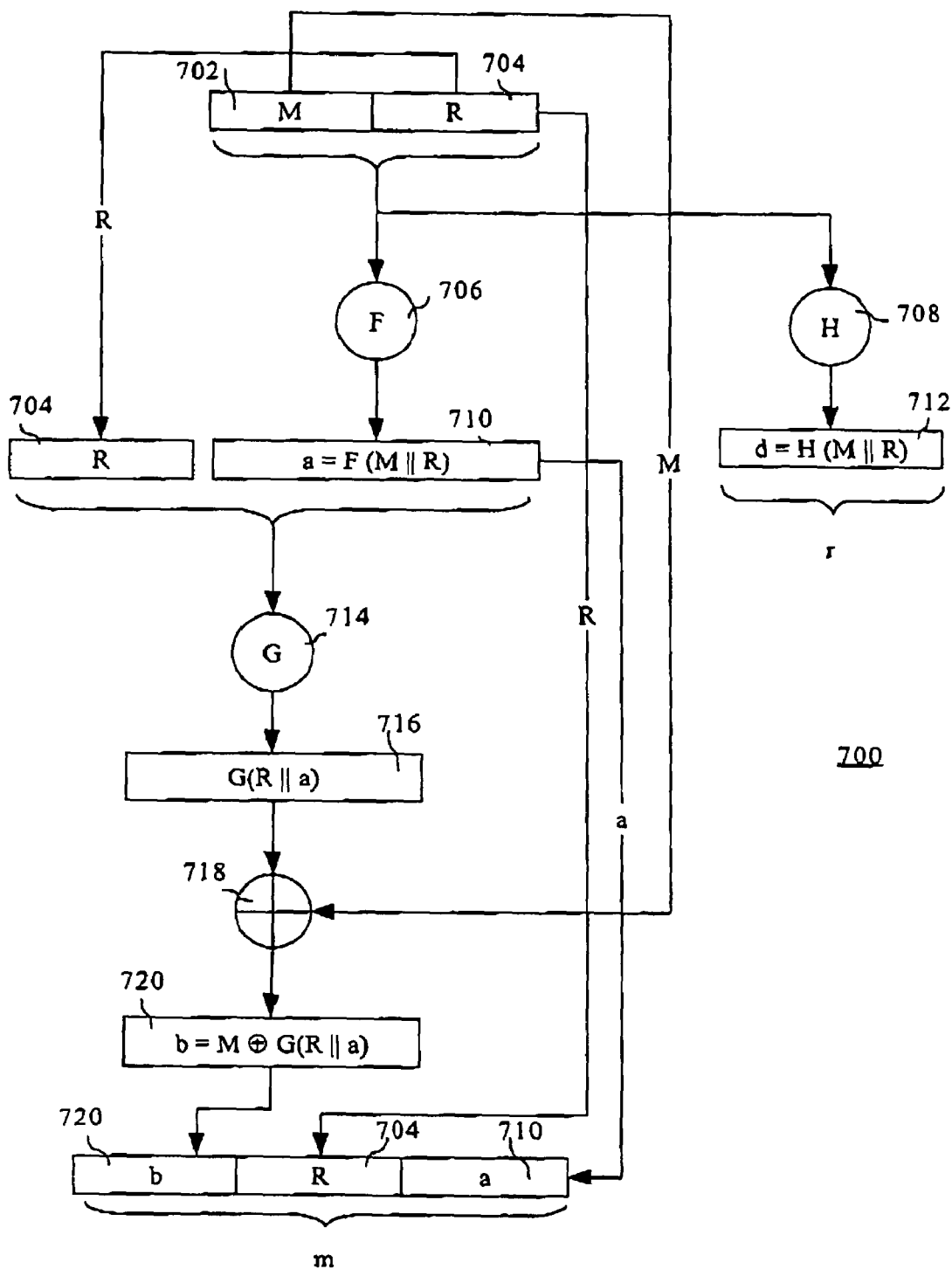
FIG. 8 is a schematic representation of a circuit used to pad messages.
Figure 9:
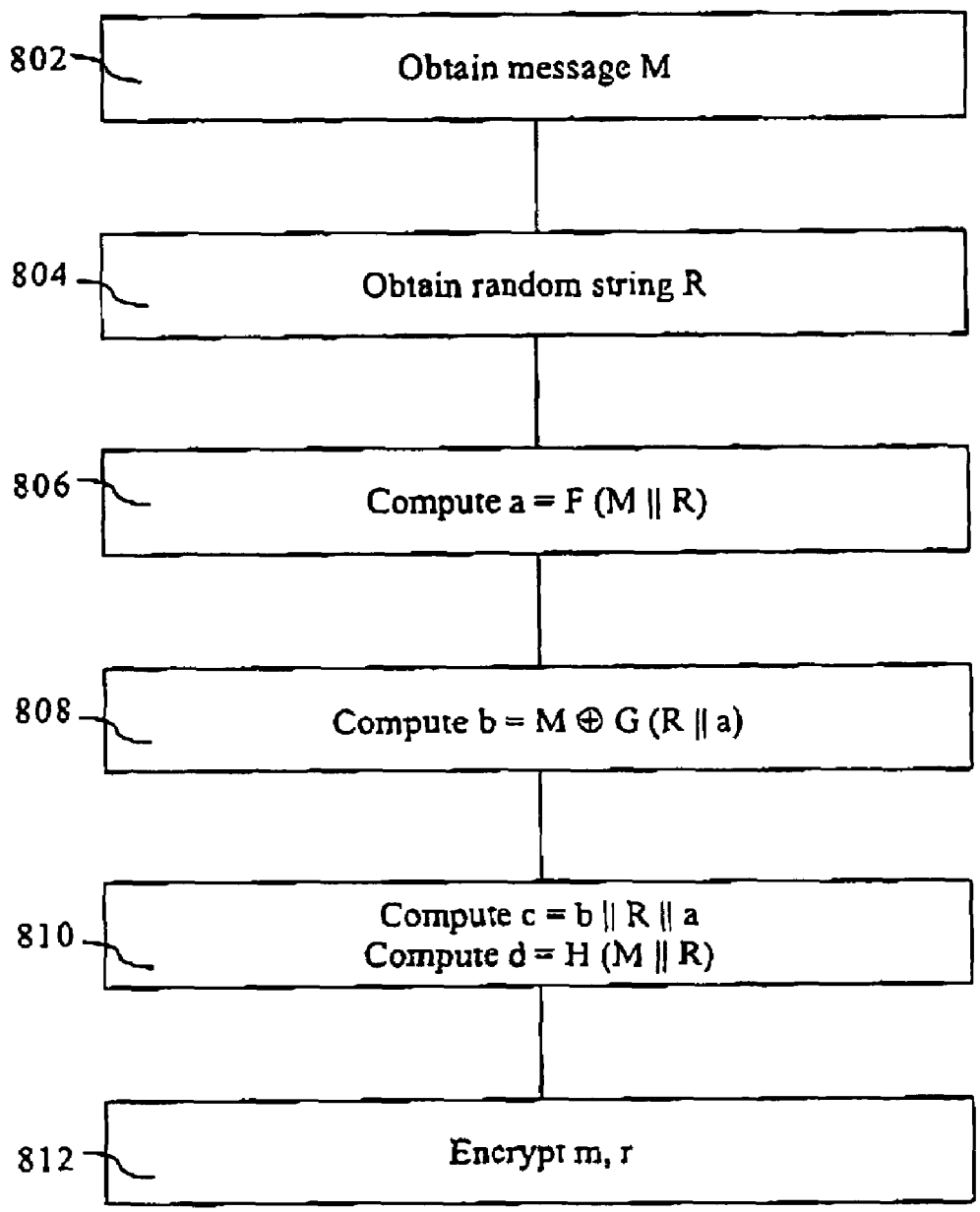
FIG. 9 is a schematic representation of a method of padding using the circuit of FIG. 8.

In a further embodiment shown in FIGS. 8 and 9, an alternative method of padding messages is used. Referring to FIG. 8, a circuit is shown generally by the numeral 700. The circuit 700 includes registers 702 and 704 which hold a message M and a random string κ, respectively. The number of bits in the message m is denoted by $k_1$, and the number of bits in the random string R is denoted by $k_2$. The circuit 700 outputs a padded message m and a padded nonce r of bit lengths mlen and rlen respectively. The length mien is at least $k_1+k_2$. The circuit uses a hash function F 706, a hash function G 714 and a hash function H 708. The hash functions F and H take as input a binary string of length $k_1+k_2$. The output of F is $k_3$=mlen−$k_1$−$k_2$ bits, hash function G takes input of $k_2+k_3$ bits and produces output of $k_1$ bits. The hash functions F and H are connected to a concatenation of registers 702 and 704 to receive input of the binary string M∥R of length $k_1+k_2$. The output of the hash function F 706 is a value a=F(M∥R) 710. The hash function G 714 uprights on a concatenation of R 704 and a 710 of bit length $k_2$. The output of the hash function G 714 is a value G(R∥a716) of $k_1$ bits. The register 716 is connected to an XOR gate 718. The register M 702 is also connected to the XOR gate 718. The output of the XOR gate 718 is a register 720 containing bM+G (R∥a) of $k_1$ bits. The resulting message m is a concatenation of registers 720, 704, and 710 of $k_1+k_2+k_3$ bits. Notationally, m=b∥R∥a. The output of the hash function H 708 is a value d=H(M∥R) 712 of rlen bits. The value of d is used as the nonce r.

In operation of the circuit 700, the steps 800 to FIG. 9 are performed. First, at step 802, a message M is obtained. Then, a random string R is obtained at step 804. Then the value a is computed at step 806. The value a is equal to the value of the hash function F applied to M∥R, the concatenation of M and R. The value b is then computed at step 808 as M⊕G (R∥a). At step 810, the values c and d are computed, where c=b∥R∥a and d=H(M∥R). Finally, the result in values m and r are encrypted at step 812. Once the values have been encrypted as shown in FIG. 9, a recipient will be able to decrypt them and obtain the original message M. Because of the padding, the additional steps of FIGS. 10 and 11 will be used by the recipient.

Figure 10:
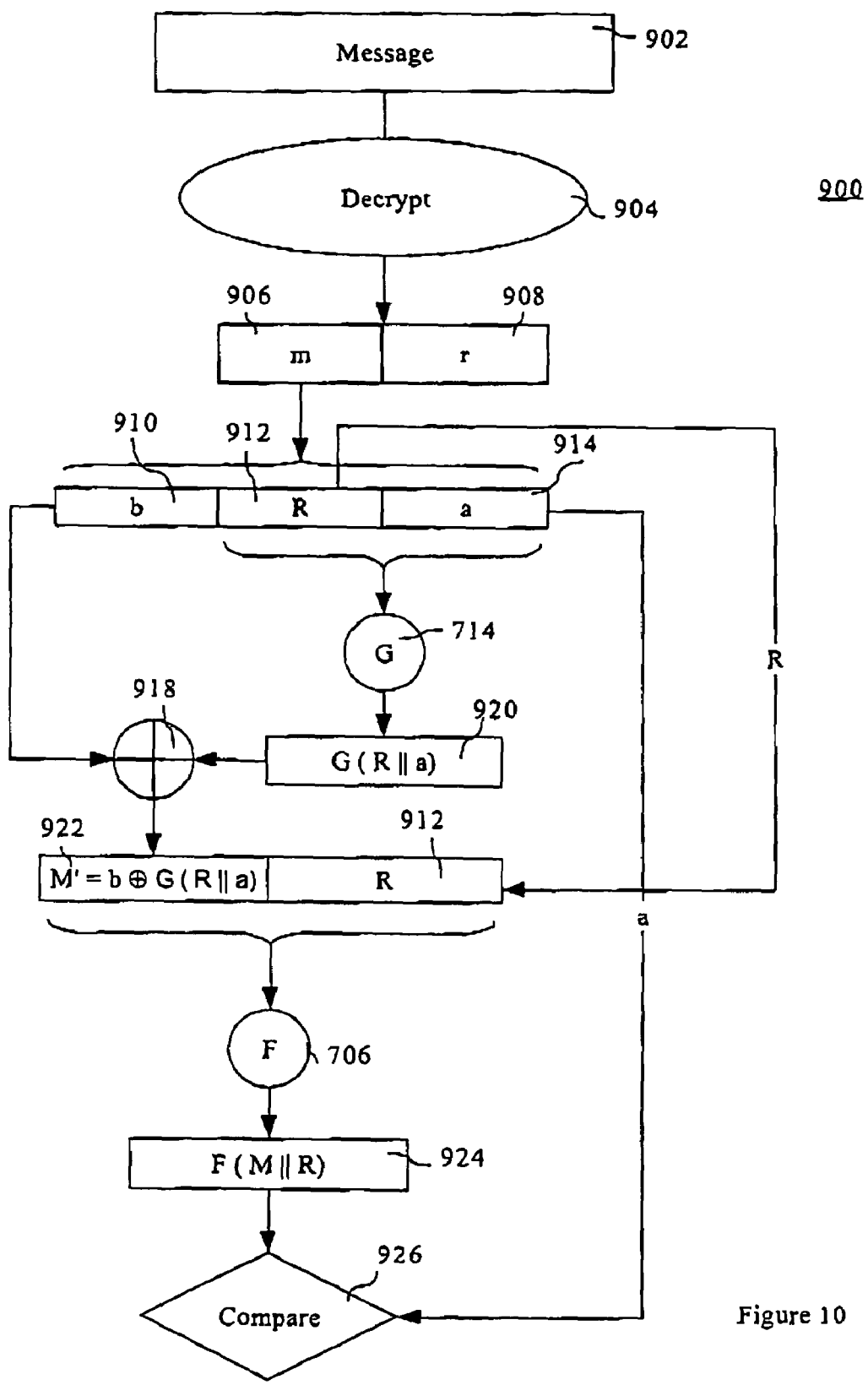
FIG. 10 is a schematic representation of a circuit used to recover a message from a padded message.

Referring therefore to FIG. 10, a circuit for recovering the message from the padded message is shown generally by the numeral 900. The circuit 900 takes as input an encrypted message 902. The circuit then applies the NTRU decryption method 904. The result of the decryption is a padded message m and a padded nonce r in registers 906, 908 respectively. Assuming the decryption is successful, these values will be equal to the values encrypted by the sender. The circuit 900 then splits the register 906 into three values b, R, a in registers 910, 912 and 914 respectively. The hash function G 714 is connected to the registers 912 and 914 to produce a value G(R∥a) stored in register 920. An XOR gate 918 is connected to the values b, and register 910 and the register 920. The XOR gate produces a value in register 922 which is equal to b⊕G (R∥a). The hash function F 706 is connected to the registers 922 and 912 to produce a value of F(M∥R) in register 924. A comparator 926 operates to compare register 924 to the value a in register 914.

Figure 11:
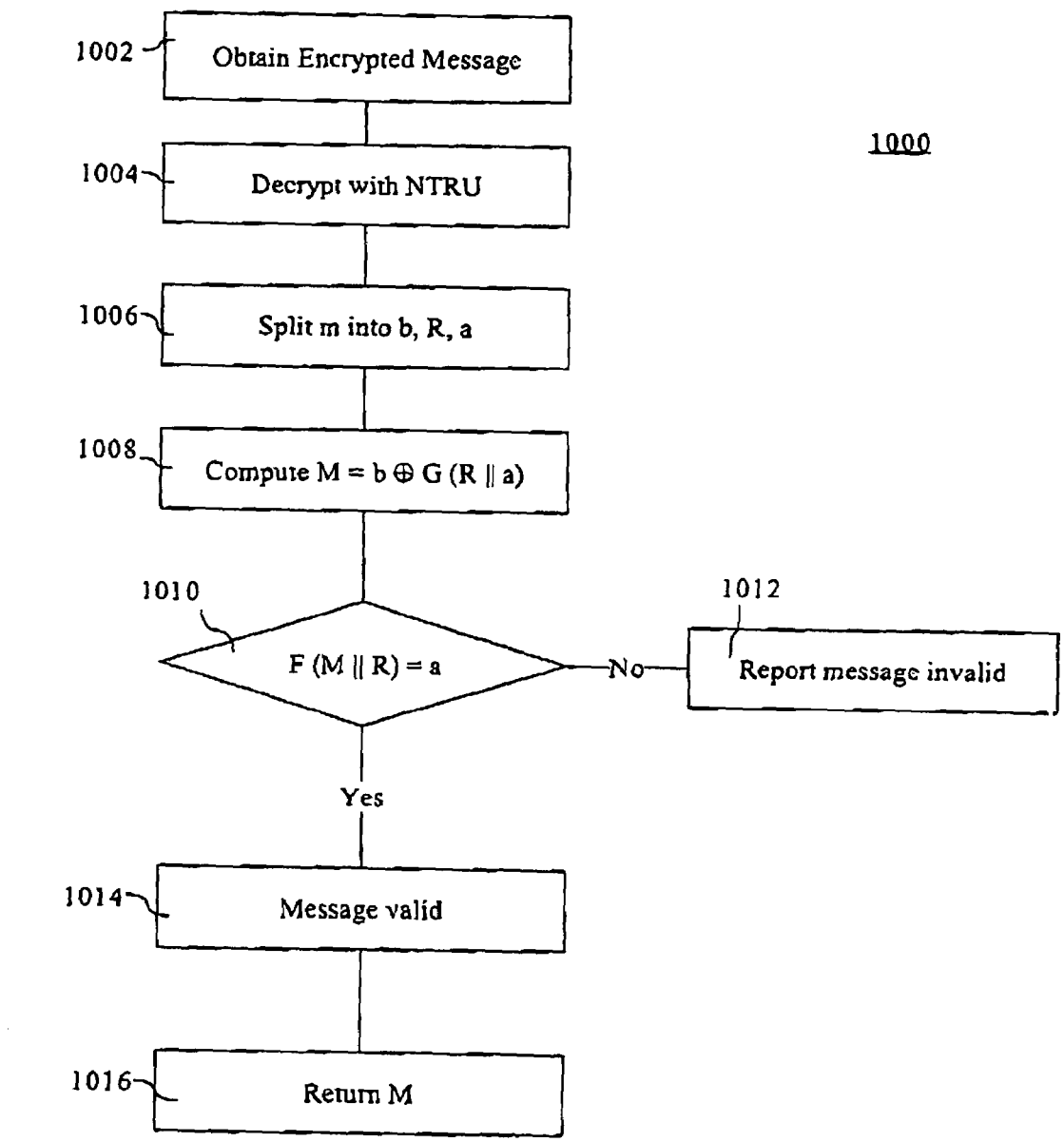
FIG. 11 is a schematic representation of a method performed by the circuit of FIG. 10.

Referring to FIG. 11, the steps performed by the circuit 900 are shown generally by the numeral 1000. An encrypted message is first obtained at step 1002. Then the encrypted message is decrypted with NTRU at step 1004. At step 1006 the value m is split into its components b, R and a. Then the value M=b⊕G(R∥a) is computed at step 1008. At step 1010, the value F (m∥R) is compared to the value a. If the values are not the same, then the message is reported as invalid and step 1012, otherwise, these values are equal and the messages reported as valid at step 1014. The value M is then returned at step 1016 as the result of the decryption.

Now consider the control over m and r of an attacker who can select M and R. Since r is generated from d=H (M∥R) the attacker has no direct control over any of the bits which determine r. The attacker does have control over R and thus since m is generated from c=b∥R∥a the attacker can control at least $k_2$ of the mlen bits used to form m Since a=F(M∥R) and b=M⊕G (R∥a) the attacker does not have direct control over any of the bits of a or b (The bits of a and b will change randomly when any of the bits of R or M change). This said, die attacker can exert some control over the bits of a, b and d repeatedly trying M, R combinations. However, as a, b, and d will change randomly for each M and R this control is limited by the amount of work which an adversary can perform.

It is recognized that there are many variations of this padding scheme which provide the desired features. These include permuting the orders of the bit strings concatenated to form a, b, c, or d, as well as replacing b with M⊕G' (a) and d with H'(M⊕G (a)), H'(M||a) or H'(R||a), (where G' and H' are hash functions of the appropriate lengths.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of decrypting a message encrypted using a truncated ring cryptosystem, the method comprising the steps of:
   a) selecting a window parameter T determining a plurality of windows of a predetermined size, each window being shifted by an amount less than or equal to the window parameter T;
   b) determining a decryption candidate for each possible window;
   c) testing each decryption candidate to determine whether it is a valid message,
   d) choosing the result of the decryption to be a valid message found in step c or if no valid message is found indicating that the message could not be decrypted;
whereby a constant number of decryption candidates are determined for each decryption.

2. A method of decrypting a message encrypted using a truncated ring cryptosystem, the method comprising the steps of:
   a) generating a random sequence of integers less than a fixed value, each integer corresponding to a window of a predetermined size and being shifted by the amount of the integer;
   b) successively determining decryption candidates for each possible window, testing the decryption candidates until a valid message is found, and choosing the valid message as the result of the decryption;
   c) if no valid message is found after each possible window is used, indicating that the message could not be decrypted.

3. A method of selecting system parameters for a truncated ring cryptosystem, the method comprising the steps of:
   a) selecting an initial set of parameters;
   b) generating private keys;
   c) testing the vulnerability of each private key to an attack on the cryptosystem based on determining indecipherable messages;
   d) when the cryptosystem is vulnerable, repeatedly increasing the value of one of the parameters and re-testing the vulnerability until the vulnerability has been reduced.

4. A method of encryption with a truncated ring cryptosystem, the method comprising the steps of:
   a) using first, second and third cryptographic hash functions to obtain a first string from a message and a number;
   b) using said number as a second string;
   c) using said first cryptographic hash function to obtain a third string from said message and number;
   d) forming a padded message from said first, second, and third strings;
   b) encrypting the padded message with an encryption function.

5. A method according to claim 4, wherein said first string is formed by applying said first hash function to combine said message and said number into a first value, applying said second function to said first value and said number to obtain a second value, and applying said third hash function to said second value and said message to obtain said first string.

6. A method according to claim 5 wherein determining said first value includes concatenating said message and said number.

7. A method according to claim 6, wherein determining said second value includes concatenating said number and said first value.

8. A method according to claim 7, wherein determining said first string includes computing an exclusive or of said message and said second value.

9. A truncated ring cryptographic system comprising:
   a) system parameters selected by testing the vulnerability of randomly chosen private keys to an attack based on determining indecipherable messages;
   b) an encryption engine;
   c) a decryption engine.

10. A truncated ring cryptographic system comprising:
    a) system parameters including a window parameter less than 30;
    b) an encryption engine;
    c) a decryption engine.

11. A truncated ring cryptographic system according to claim 10 wherein said window parameter is less than 10.

12. A truncated ring cryptographic system according to claim 11 wherein said window parameter is 3.

13. A truncated ring cryptographic system according to claim 11, wherein said window parameter is 2.

14. A truncated ring cryptographic system according to claim 11, wherein said window parameter is 1.

15. A decryptor for a truncated ring cryptographic system comprising:
    a) a window parameter T determining a plurality of windows of a predetermined size, each window being shifted by an amount less than the window parameter T;
    b) a calculator to determine a decryption candidate for each possible window;
    c) a tester to determine whether each decryption candidate is a valid message;
    d) a selector to choose the result of the decryption to be a valid message found in step c or if no valid message is found indicate that the message could not be decrypted.

16. A decryptor for a truncated ring cryptographic system comprising:
    a) a random sequence of integers less than a fixed value, each integer corresponding to a window of a predetermined size and being shifted by the amount of the corresponding integer;
    b) a calculator to determine a decryption candidate for each possible window;
    c) a tester to determine whether each decryption candidate is a valid message;
    d) a selector to choose the first valid message found by the tester as the result of the decryption.

17. A system parameter selector for a truncated ring cryptographic system comprising:
    a) an initial set of parameters;
    b) a private key generator;
    c) an attack engine to determine the vulnerability of each private key to an attack on the cryptosystem based on determining indecipherable messages;

d) a parameter updater to repeatedly increase the value of one of the parameters and run the attack engine until the vulnerability of the system to the attack has been reduced.

18. An encryptor to encrypt a message in a truncated ring cryptographic system comprising:
    a) a fist, a second, and a third cryptographic hash function;
    b) a generator to generate a number,
    c) a message padder configured to form a padded message from a first string computed using said first, second and third cryptographic hash functions on said message and said number, a second string formed from said number and a third string computed using said first cryptographic hash function on said message and said number;
    d) an encryptor to encrypt said padded message using an encryption function.

19. An encryptor according to claim 18, wherein said first string is formed by applying said first hash function to combine said message and said number into a first value, applying said second function to said first value and said number to obtain a second value, and applying said third hash function to said second value and said message to obtain said first string.

20. An encrytor according to claim 19 wherein combining said message and said number into said first value includes concatenating said message and said number.

21. An encryptor according to claim 20, wherein obtaining said second value includes concatenating said number and said first value.

22. An encryptor according to claim 21, wherein obtaining said first string includes computing an exclusive or of said message and said second value.

23. A data carrier containing instructions to direct a processor to decrypt a message encrypted using a truncated ring cryptosystem, the data carrier including instructions to:
    a) select a window parameter T determining a plurality of windows of a predetermined size, each window being shifted by an amount less than or equal to the window parameter T;
    b) determine a decryption candidate for each possible window;
    c) test each decryption candidate to determine whether it is a valid message;
    d) choose the result of the decryption to be a valid message found in step c or if no valid message is found indicating that the message could not be decrypted;
whereby a constant number of decryption candidates are determined for each decryption.

24. A data carrier containing instructions to direct a processor to decrypt a message encrypted using a truncated ring cryptosystem, the data carrier including instructions to:
    a) generate a random sequence of integers less than a fixed value, each integer corresponding to a window of a predetermined size and being shifted by the amount of the integer;
    b) successively determine decryption candidates for each possible window, test the decryption candidates until a valid message is found, and choose the valid message as the result of the decryption;
    c) if no valid message is found after each possible window is used, indicate that the message could not be decrypted.

25. A data carrier containing instructions to direct a processor to select system parameters for a truncated ring cryptosystem, the data carrier including instructions to:
    a) select an initial set of parameters;
    b) generate private keys;
    c) test the vulnerability of each private key to an attack on the cryptosystem based on determining indecipherable messages;
    d) when the cryptosystem is vulnerable, repeatedly increase the value of one of the parameters and re-test the vulnerability until the vulnerability has been reduced.

26. A data carrier containing instructions to direct a processor to encrypt a message using a truncated ring cryptosystem, the data carrier including instructions to:
    a) use first, second and third cryptographic hash functions to obtain a first string from a message and a number;
    b) use said number as a second string;
    c) use said first cryptographic hash function to obtain a third string from said message and said number;
    d) form a padded message from said first, second, and third strings;
    b) encrypt the padded message with an encryption function.

27. A data carrier according to claim 26, wherein said first string is formed by applying said first hash function to combine said message and said number into a first value, applying said second function to said first value and said number to obtain a second value, and applying said third hash function to said second value and said message to obtain said first string.

28. A data carrier according to claim 27 wherein determining said first value includes concatenating said message and said number.

29. A data carrier according to claim 28, wherein determining said second value includes concatenating said number and said first value.

30. A data carrier according to claim 29, wherein determining said first string includes computing an exclusive or of said message and said second value.

* * * * *